United States Patent
Costa

[19]

[11] Patent Number: 6,151,605
[45] Date of Patent: Nov. 21, 2000

[54] GENERIC CONFIGURATION FILE PROCESSING LIBRARY AND EXECUTABLE

[75] Inventor: Brian Costa, Denver, Colo.

[73] Assignee: Hewlett-Packard Company, Palo Alto, Calif.

[21] Appl. No.: 09/087,789

[22] Filed: May 29, 1998

[51] Int. Cl.[7] .................................................. G06F 17/30
[52] U.S. Cl. ..................... 707/101; 707/103; 709/303; 717/1
[58] Field of Search .................................... 707/100–103, 707/200–205; 395/708, 705–707; 717/1.5–7.8; 709/302, 303

[56] References Cited

U.S. PATENT DOCUMENTS

| | | | |
|---|---|---|---|
| 5,822,580 | 10/1998 | Leung | 707/103 |
| 5,832,498 | 11/1998 | Exertier | 707/103 |
| 6,014,637 | 1/1999 | Fell et al. | 705/26 |

*Primary Examiner*—Hosain T. Alam

[57] ABSTRACT

A method of configuring software applications is provided. A configuration file processing library implements a configuration file processor. Applications are compiled utilizing the configuration file processing library to generate generic configuration file processing code for reading and manipulating data in a generic configuration file. When the file is executed, the application stantiates a configuration file processor applications programming interface through which the configuration file is read or manipulated by applications independent of the user's operating environment.

15 Claims, 2 Drawing Sheets

300 — CFGFILE

<filename>
<sepChars>
<attrNames>
<ignore EOL comments>

Methods

::getFileName
::getFirstAttribute
::getNextAttribute
::getAttribute
::setOrReplaceAttribute
::expandString

*fig. 3*

GENERIC CONFIGURATION FILE PROCESSING LIBRARY AND EXECUTABLE

FIELD OF THE INVENTION

The present invention pertains generally to software applications and, more particularly, to a generic configuration file processing library and executable.

BACKGROUND OF THE INVENTION

Software applications often require the use of configuration information about the user's operating environment to be able to run in different environments. This configuration information is usually persistent, meaning that it must be maintained while the application is not running. Accordingly, configuration information is typically stored in one or more separate configuration files that may be manipulated by a user or another application.

No universally recognized standard exists for configuration file formats. Accordingly, each software application must provide it's own configuration file processing code to process, add, delete and modify contents of its configuration files. Thus, a need exists for a generic configuration file processor that eliminates the need for each application to implement its own configuration file processing code.

SUMMARY OF THE INVENTION

In accordance with the principles of the invention, a flexible and generic configuration arrangement is provided. A generic configuration file processing library is utilized to compile an application to allow applications to process a configuration file.

In accordance with the invention, a method of configuring software applications includes the steps of providing a configuration processing library. The configuration processing library allows the applications to work with a configuration file. The configuration processing library is utilized to generate generic configuration processing code. The generic processing code is utilized to read and manipulate data in the configuration processing library. The application is compiled with the configuration processing library. Instantiating a configuration file processing application's programming interface occurs through which the configuration file is read or manipulated.

Still further in accordance with the invention, an input string is obtained and tokens are replaced in the input string with associated values obtained from the configuration file.

BRIEF DESCRIPTION OF THE DRAWING

The invention will be better understood from a reading of the following detailed description taken in conjunction with the drawing in which like reference designators are used to designate like elements, and in which:

FIG. 3 is a data model of an instance of a configuration file processor object in accordance with the invention.

DETAILED DESCRIPTION

Figures 1, 2:
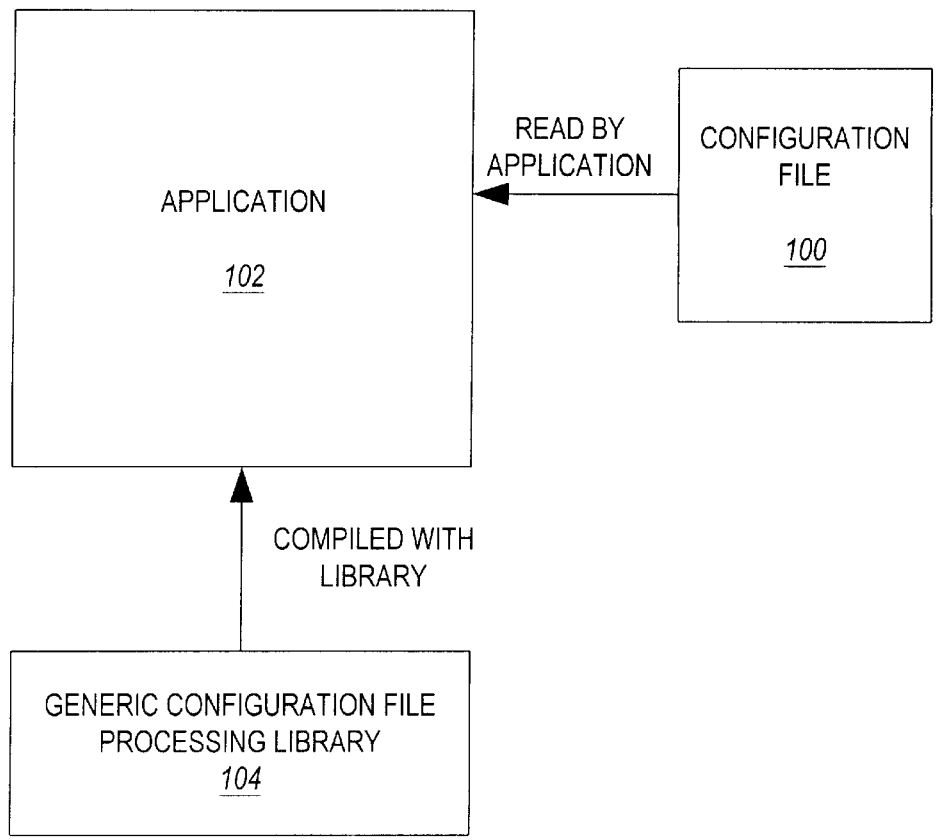
FIG. 1 is a block diagram of a system in which the invention operates.
FIG. 2 is an example format of a configuration file.

FIG. 1 is a block diagram illustrating the relationship between an application 102, a configuration file 100, and a configuration file processing library 104 which implements the configuration file processor of the invention. Application 102 is compiled with configuration file processing library 104, which defines the classes and constructor required by application 102 to generate generic configuration file processing code for reading and manipulating data in generic configuration file 104. When executed, application 102 then instantiates a configuration file processor applications programming interface (API) through which configuration file 100 is read or manipulated by applications independent of the user's operating environment.

FIG. 2 is an example format of configuration file 100. Configuration file 100 generally includes one or more primary key, a set of fields, and optionally, a set of comments. In the illustrative embodiment, configuration file 100 includes a comment header 122, comments before lines 124, end-of-line comments 126, and a plurality of lines 110 comprising the primary key and associated field information. Generally, the primary key 112 defines an attribute name and its associated fields include values 116 associated with the attribute name, along with one or more separators 114, 118 used for parsing purposes. In the example shown, attribute Attribute_Name_1 has J values associated with it, namely Value_A, Value_B, . . . , Value_J, each separated by commas. Attribute Attribute_Name_N has K values associated with it, namely Value_A, Value_B, Value_K.

A sample configuration file SAMPLE.CFG is shown in Table 1 below for further illustration.

TABLE 1

```
# SAMPLE.CFG
# This section is a file comment. Each line begins with a pound sign,
# which identifies the line as a comment. Typically configuration
# files have some sort of header comment block such as this which
# explains the purpose and content of the file.

# For this configuration file the file comment might contain
# information identifying the application that owns this configuration
# file, the format of the file, why it is used, etc.

# Each line of this configuration file has the form:
# <attribute name>: <1st value>, <2nd value>, <3rd value>, <4th
# value>, <5th value>

# For this file the character ":" has been chosen to separate the
# <attribute name>from the <first value>, and the character ", " has
# been chosen to separate each of # the other values from each other.

# The interpretation of the content of the file is as follows:
# <Attribute Name> is the name of an individual.
# <1st value> is a street address.
# <2nd value> is a city.
# <3rd value> is a state.
# <4th value> is a zipcode.
# <5th value> is a phone number.

Bob Black: 100 Main St., Oakville, Colorado, 80888, 303-555-5555
Bill Brown: 200 Central, Elmville, Colorado, 80889, 303-555-6666
Ann Green: 300 1st St., Walnut City, Colorado, 80999, 303-555-7777
Sue White: 400 2nd Ave., Birchtown, Colorado, 88899, 303-555-8886
```

In Table 1, the defined layout for the data is, from left to right, the attribute name, colon, and then five values separated by commas. The name of the individual has five fields associated with it. A street address is mapped to the first value, a city to the second value, a state to the third value, a zipcode to the fourth value, and a telephone number to the fifth value. The current example is a database stored as a configuration file.

As will be appreciated by those skilled in the art, the format of any given configuration file is arbitrary and can be defined using any syntax. A configuration file can include any number of primary keys followed by zero or more associated fields, comments, and field delimiting separator formats. To complicate matters further, each primary key may have a varying number of fields associated with it.

Configuration file processing library 104 is a utility that allows an application 102 to work with any type of configuration file 100, having any number of fields per primary key, any number and position of comment fields, and any number and format of field delimiting separators. When an application 102 is compiled with configuration file processing library 104, the application is provided with the ability to easily create, manipulate, and or process configuration file 100 using object oriented processing methods. These methods allow the application to "get" and "set" attributes and associated values in the file. In the preferred embodiment, configuration processing library 104 also allows the application to "expand" strings by replacing tokens contained in an input string with the associated values from the configuration file 100.

In accordance with a preferred embodiment of the invention, configuration file processing library 104 supports a "GetFirst" method, which returns data structures containing the values of the first attribute in the file to the application. Library 104 also supports a "GetNext" method, which when used with "GetFirst" method, allows the application developer to iterate through all entries in a configuration file, processing each as necessary. Library 104 also supports a getAttribute method which returns the appropriate list of values based on the attribute name specified. Library 104 also provides support for a "SetOrReplace" method, which allows the application developer to save attributes in the configuration file, overwriting an attribute with the same attribute name if one exists, or appending the new attribute to the end of the list if the attribute name specified is unique to the configuration file. Library 104 also supports an "ExpandString" method, which allows the application developer to specify a string as input which contains tokens that the developer wants replaced by the associated values from the configuration file.

Because applications require varying configuration files, the configuration file processing library 104 of the invention supports unconstrained name space for the configuration filename, multi-byte character support for all aspects of the library 104, support for an unlimited number of primary keys, an unlimited number of fields per primary key, and a varying number of fields per primary key. Library 104 also supports the ability to define each of the separator characters used to parse each line in the configuration file into its primary key and associated fields, the ability to associate conceptual names, such as "street", "city", "state", "zipcode", "phone" with the fields for each attribute to enable easier human-readable processing of the data, and the ability to include end-of-line comments for each primary key.

In accordance with the preferred embodiment of the invention, configuration file processing library 104 comprises a set of C++ classes which collectively provide generic configuration file processing capability. The primary class has one constructor of the form:

ConfigFile<cfgFile>(<filename>,<sepChars>, <attrNames>,<Ignore EOL comments>) <cfgFile>is a variable name that assigns the class to an instantiation. Argument <filename>is a string that identifies the file path and file name of the configuration file to be processed. Argument <sepChars>is a white space delimited list of separator characters to recognize when parsing a line from the configuration file identified in <filename>into its associated "attribute name" and "values". The separator characters are processed in order from left to right, one separator character per parsed field. For example, if the string ": @" is specified as <sepChars>, then the primary key, or attribute name, will be anything preceding a first occurrence of a ":" character in the given line, and the "169" character will be recognized as the separator used to parse the values for this attribute. The <sepchars>string can contain any number of characters. For example, if the string ": @%o" is specified as <sepChars>, then the ":" would be recognized as separating the "attribute name" from the "first value", the "@" character would be recognized as separating the "first value" from the "second value", and the "%o" character would be recognized as separating the "second value" from the "third value". The "%o" character would also be recognized as separating the "3rd value" from the "4th value", the "fourth value" from the "fifth value", and so on, in the case where additional "#"characters existed in the line.

As mentioned previously, separator characters are parsed from the <sepchars>string argument from left to right. If more separator characters than values exist in a given line, any unparsed separator characters contained in <sepchars>are ignored. If more values exist in a given line than separators specified in <sepChars>, the last separator character specified in the <sepchars>string is recognized as the separator character while parsing the remainder of the line. For example, a <sepchar>string having a value "," would be used to parse a standard comma delimited file, regardless of the number of fields associated with a given primary key of the file. The "," character would be recognized as separating all the fields for the primary key.

A Null value specified in the <sepChars>parameter indicates that a default separator character (e.g.,",") is used to delimit fields in a line.

Parameter <attrNames>maps conceptual names to fields of a primary key in the configuration file. This allows the configuration file data to be processed in human-readable form. By associating <attrNames>with fields, the application developer can then process the contents of the configuration file using those conceptual names. For example, to process sample configuration file SAMPLE.CFG, the <attrNames>string would be specified as "street city state zipcode telephone". This associates the conceptual identifiers "street", "city", "state", "zipcode", and "telephone" with their fields for each attribute name in configuration file SAMPLE.CFG. When more fields exist for a primary key than names specified by parameter <attrNames>, integers, presented as strings "1", "2", "3", ?, are used to identify the values. A Null value specified for <attrNames>parameter results in the default integer strings (i.e., "1", "2", "3", etc.) being used to identify the values for each primary key.

Parameter <ignore EOL comments>is either true or false. If it is set to true, then the end-of-line comments in the configuration file (denoted in sample configuration file SAMPLE.CFG by beginning with "#") are completely ignored when the configuration file is parsed into primary keys and associated fields. If parameter <ignore EOL comments>is set to false, then the end-of-line comments are processed as part of the configuration file line. In this case, the <sepChar>string should have a "#" character as the last character so that the comments are parsed correctly.

To utilize the configuration file processing utility of the invention, application 102 includes code to instantiate a configuration file processing object 300, as shown in FIG. 3, of the class ConfigFile using the constructor ConfigFile <cfgFile>(<filename>, <sepChars>, <attrNames>, <Ignore EOL comments>), and passing <filename>, <sepChars>, <attrNames>, and <Ignore EOL comments>parameters that are specific to the configuration file 100 that it is to interface with. Once configuration file processing object 300 is instantiated, the configuration file 100 specified by the <filename>parameter may be processed according to the specified <sepChars>, <attrNames>, and <Ignore EOL comments>parameters by performing method calls on one or more of methods getFileName, getFirstAttribute, getNextAttribute, getAttribute, setOrReplaceAttribute, and expandstring of configuration file processing object 300. In the preferred embodiment, results of this processing are stored in in-memory data structures for retrieval. The configuration file is kept synchronous to the in-memory data structures as changes are made to the in-memory data structures.

The configuration file processing object 300 implements the following methods: getFileName, getFirstAttribute, getNextAttribute, getAttribute, setOrReplaceAttribute, and expandstring.

Method getFileName returns a character string that contains the path to the configuration file or creates a file if it doesn't exist. In the preferred embodiment, the form of getFileName is:

char * getFileName()

Method getFirstAttribute returns the attribute name (i.e., primary key) and associated attribute values (i.e., associated fields) for the first data entry in the configuration file. The attribute name and associated values are determined at instantiation time, based on the <sepchars>passed into the constructor. In the preferred embodiment, the form of getFirstAttribute is:

int getFirstAttribute(char *& name, AttributeList *& attrList)

Method getNextAttribute returns the attribute name (i.e., primary key) and associated attribute values (i.e., fields) for the next data entry in the configuration file. The name and values are determined at instantiation time, based on the <sepchars>passed into the constructor. In the preferred embodiment, the form of getNextAttribute is:

int getNextAttribute(char *& name, AttributeList *& attrList) If there are no more data entries in the configuration file, then the method returns a "−1", and <name>and <attrList>are set to NULL.

Method getAttribute returns the appropriate list of values based on the attribute name specified. The name and values are determined at instantiation time, based on the <sepChars>parameter passed into the constructor. In the preferred embodiment, the form of getAttribute is:

int getAttribute(const char *& name, AttributeList *& attrList)

If there are no data entries in the configuration file matching the specified <name>, then the method returns a "−1" and <name>and <attrList>are set to NULL.

Method setOrReplaceAttribute creates an entry in the specified configuration file based on the <name>and <attrList>parameters that are passed to it. The <sepchars>specified in the constructor are used to create the entry in the configuration file. In the preferred embodiment, the form of setOrReplaceAttribute is:

int setOrReplaceAttribute(char * name, AttributeList * attrList)

Method setOrReplaceAttribute returns a "o" (SUCCESS) unless a problem occurs in completing execution of the method call.

Method expandstring uses the values stored in the configuration file to replace specific tokens in a string with the associated values from the configuration file. The token, which is recognized and replaced, is of the following form:

${<attribute name>:<attribute value>} Where <attribute name>is the desired attribute name from the configuration file, and <attribute value>identifies which value to retrieve. For example, given the sample configuration file located at "/config.fil" and the following instantiation:

ConfigFile configFile("/config.file",":,","street city state zipcode telephone", 1); expandstring method could be invoked as follows:

char * newStr =configFile.expandString("Bill Brown is from the city of ${Bill Brown:city}, in the state of ${Bill Brown:state}");

After execution of this method, newStr contains "Bill Brown is from the city of Elmville in the state of Colorado".

A C++ code implementation is included in Appendix A.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for allowing a software application to access a configuration file, said configuration file comprising data used by said software application, comprising the steps of:

providing a configuration processing library, said configuration processing library comprising a body of callable executable code which provides flexible parsing functionality for reading and manipulating data in configuration files;

inserting calls to said callable executable code into said application to read and/or manipulate said configuration file;

compiling said application with said configuration processing library; and executing said application, wherein execution of said calls inserted in said application allow said application to read and/or manipulate said configuration file.

2. A method in accordance with claim 1, comprising:

obtaining an input string; and replacing tokens in said input string with associated values obtained from said configuration file.

3. A method in accordance with claim 1, comprising:

returning data structures to said application containing values of a first attribute in said configuration file.

4. A method in accordance with claim 1, comprising:

specifying an attribute name; and providing from said library a predetermined list of values in response to receiving said attribute name.

5. A method in accordance with claim 1, wherein:

said library comprises C++ classes, said C++ classes collectively providing generic configuration file processing capability.

6. A method in accordance with claim 1, wherein:

said application includes code to instantiate a processing object of said configuration file.

7. A method in accordance with claim 1, comprising:

instantiating a configuration processing object using predetermined constructors; and performing method calls on one or more methods of said object.

8. A method in accordance with claim 7, comprising:

storing processing results in in-memory data structures.

9. A method in accordance with claim 8, comprising:

synchronizing said configuration file to said in-memory data structures.

10. A method in accordance with claim 7, wherein;

said object returns a character string that contains a path to a configuration file.

11. A method in accordance with claim 10, wherein:

said object creates a configuration file if an appropriate configuration file does not preexist.

12. A method in accordance with claim 7, comprising:

determining an attribute name and an associated attribute value for a next data entry in said configuration file.

13. A method in accordance with claim 12, wherein:

said attribute name and said associated attribute value are determined at the time of said instantiating step.

14. A method in accordance with claim 7, comprising:

creating an entry in said configuration file based upon predetermined entry types passed to said configuration file.

15. A method for an application to process an arbitrary configuration file, said configuration file comprising at least one attribute, each of said at least one attribute comprising zero, one or more associated values each separated in sequence by a set of separator characters, said method comprising the steps of:

compiling said application with a generic configuration file processing library, said configuration processing library comprising a body of callable executable code which provides flexible parsing functionality for reading and manipulating data in configuration files and said application comprising calls to said callable executable code in said configuration processing library to read and/or manipulate said configuration file;

receiving a set of separator characters; and parsing said attributes and said associated values from configuration file based on said set of separator characters.

* * * * *